MODULAR CIRCUIT PACKAGE

Filed Feb. 15, 1967

2 Sheets-Sheet 1

INVENTORS
CHESTER L. SCHULER
NORMAN EDWARD CHAPMAN
BY
Weingarten, Orenbuch & Lahive
ATTORNEYS

MODULAR CIRCUIT PACKAGE

Filed Feb. 15, 1967 2 Sheets-Sheet 2

INVENTORS
CHESTER L. SCHULER
NORMAN EDWARD CHAPMAN
BY
Weingarten, Orenbuch & Lahive
ATTORNEYS 3,359,461
Patented Dec. 19, 1967

3,359,461

MODULAR CIRCUIT PACKAGE

Chester L. Schuler, Wayland, and Norman Edward Chapman, West Peabody, Mass., assignors, by mesne assignments, to Powercube Corporation, Waltham, Mass., a corporation of Massachusetts Filed Feb. 15, 1967, Ser. No. 616,244
14 Claims. (Cl. 317—100)

ABSTRACT OF THE DISCLOSURE

An electronic power circuit having the individual components disposed within, and in some instances physically and electrically connected to, heat dissipative walls to form a box-like power circuit module. The walls of the module are electrically insulated from each other while being thermally joined, so that they act to dissipate and distribute heat, function as part of the circuit wiring in addition to making up the rigid structural form of the module.

This invention relates in general to electronic circuit packaging and more particularly to exceedingly compact and efficient integrated modular packages for relatively high power circuits.

With the advent of semiconductors and the emphasis on miniaturization of electronic apparatus which followed, low power systems were markedly reduced in size and weight despite substantial increases in operational complexity. No comparable size-weight reduction, however, has been experienced in what is termed the high-power field. Thus although physically small circuits are at present being assembled for a myriad of uses, these packaging techniques and package geometries have little value or application in the higher power field because of the inability to dissipate the heat generated in the circuit components and the problems which arise when large power elements must be placed in close proximity. For this very reason, the new integrated microcircuits which have been introduced to the semiconductor industry have been restricted to low power signal or logic circuits where negligible power is involved.

With miniaturization of power circuits lagging behind that of logic circuits, the problems of heat dissipation, power, size and weight inherent in these discrete components, and the circuits in which they were used were left to be individually engineered and designed for each application. The result was that the intricate problems of mechanical mounting, space interrelationship, circuit isolation, interface mismatch, and thermal dissipation required essentially new solutions as each electronic circuit was designed. In recognition of the specific problems of compact, high power electronic circuits, packaging designers have mounted power semiconductors in comparatively large heat sinks, which have been in turn mounted on conventional chassis. Such devices often have included one or more air blowers to improve heat dissipation; still others have provided water cooling in modular circuit packages.

Bound by conventional methods of attaching discrete leaded components onto circuit boards or heat sinks along with a multiplicity of other associated hardware, the designer has not been able to utilize the maximum capability of the basic devices. First he engages in the time consuming process of assembling a breadboard circuit, which in turn has to be further engineered and refined by packaging designers taking into account the aforementioned problems of size, weight and thermal dissipation but optimum or total device capability is still not obtained. Where relatively large numbers of electronic components and associated elements were required in complex systems on optimum condition for one factor could be achieved only at the sacrifice of another. Packaging design and assembly processes became critical limiting factors in ultimate product cost and product reliability.

With the foregoing limitations of prior techniques in view, it is a principal object of this invention to provide an integrated modular electronic power circuit package featuring relatively high power rating, minimum size and weight and relatively few purely passive structural elements.

It is another object of this invention to provide a modular electronic high power circuit assembly which combines design simplicity and reduced assembly time and cost in a compact structure, with high shock resistance and enhanced operational reliability.

Still another object of this invention is to provide a modular power circuit assembly wherein the structural members of the package serve not only to provide strength and rigidity, but also physical mounting, electrical interconnection and thermal dissipation for the various electronic circuit components.

Broadly speaking, the modular circuit unit of this invention is formed of a plurality of electrically conductive side walls assembled into a hollow polygonal housing which encloses the electronic circuit components. More specifically, adjacent conductive side walls are joined by thermally conductive, electrically insulating means to provide a unitized, rigid structure within which the electronic components are arranged and interconnected, electrical connections being furnished in part by the conductive side walls. Selected electronic components are placed in intimate surface contact with the inner faces of one or more side walls to improve heat transfer, which with the aforementioned thermally conductive means, effectively precludes sharp temperature gradients at any point within the package volume. For even more effective heat dissipation to the surrounding atmosphere, the faces of the side walls may be fabricated with fins or other conventional radiators, and a thermally conductive base plate may be added for suitable physical attachment to an external chassis.

Considerable flexibility is available with the novel package of this invention since one housing configuration may be adapted for use with many different circuit designs or circuit sub-assemblies while retaining the advantages set forth above. A circuit engineered for optimum power rating within this package may be a complete functional unit or it may be connected together with other modules and stacked to obtain a more complex system.

In a specific embodiment of this invention, circuit components such as diodes or transistors may be inserted between adjacent, confronting edge surfaces of the side walls for connection into the circuit without further electrical wiring, and these edges may be specifically formed to accept various component shapes. When components are secured in the package in this manner, the rigidity thereof is improved, and in some instances the components themselves may provide the total mechanical support required.

Other advantages, objects and features of this invention will become apparent from the following detailed description when read in conjunction with the accompanying drawings, in which.

Figures 1, 2, 5:
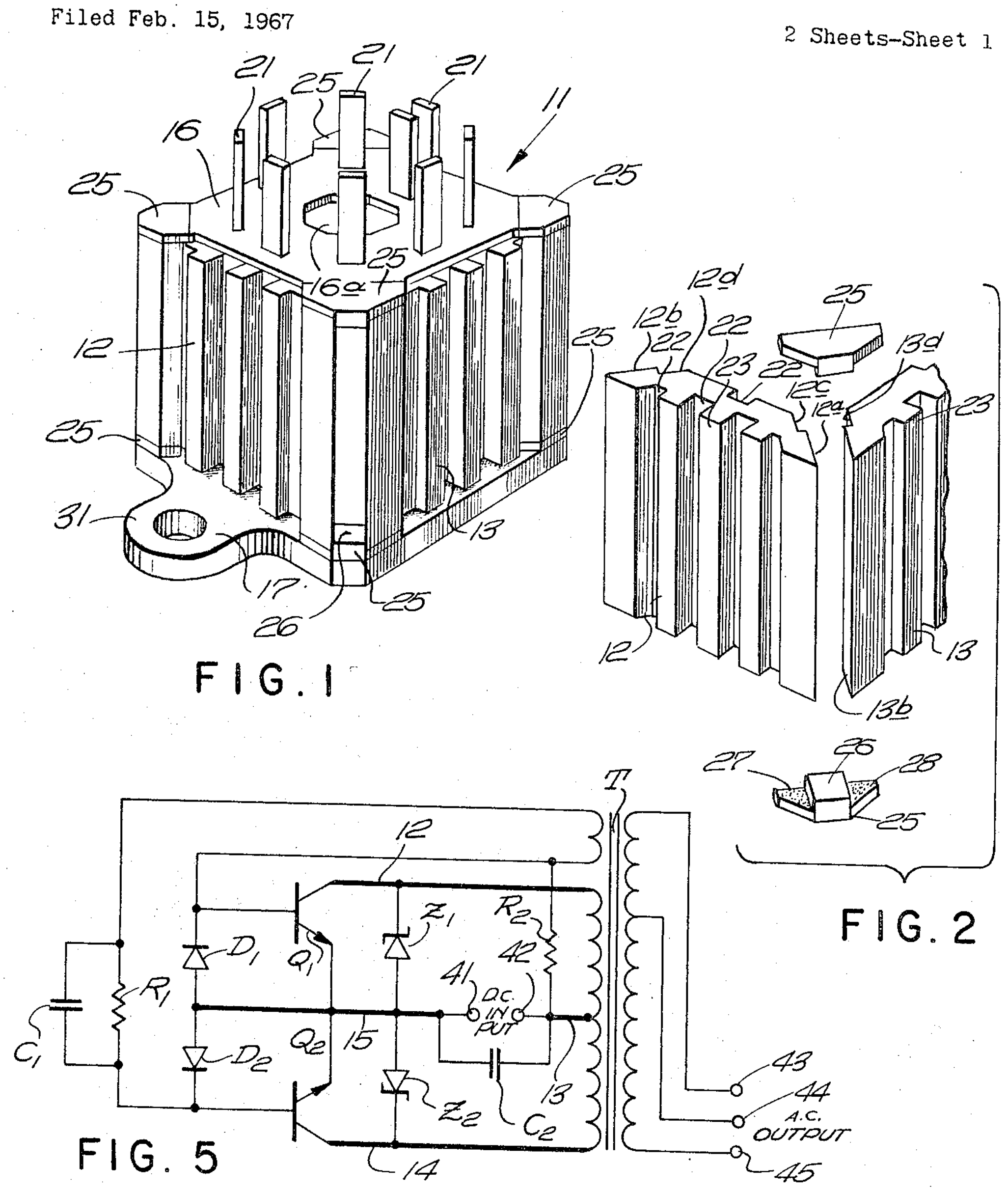
FIG. 1 is a perspective view of an integrated electronic modular power circuit package in accordance with this invention.
FIG. 2 is an exploded perspective view of one corner of the package of FIG. 1.
FIG. 5 is a schematic diagram of the electronic circuit embodied in the package shown in FIGS. 1, 3, and 4.
Figure 3:
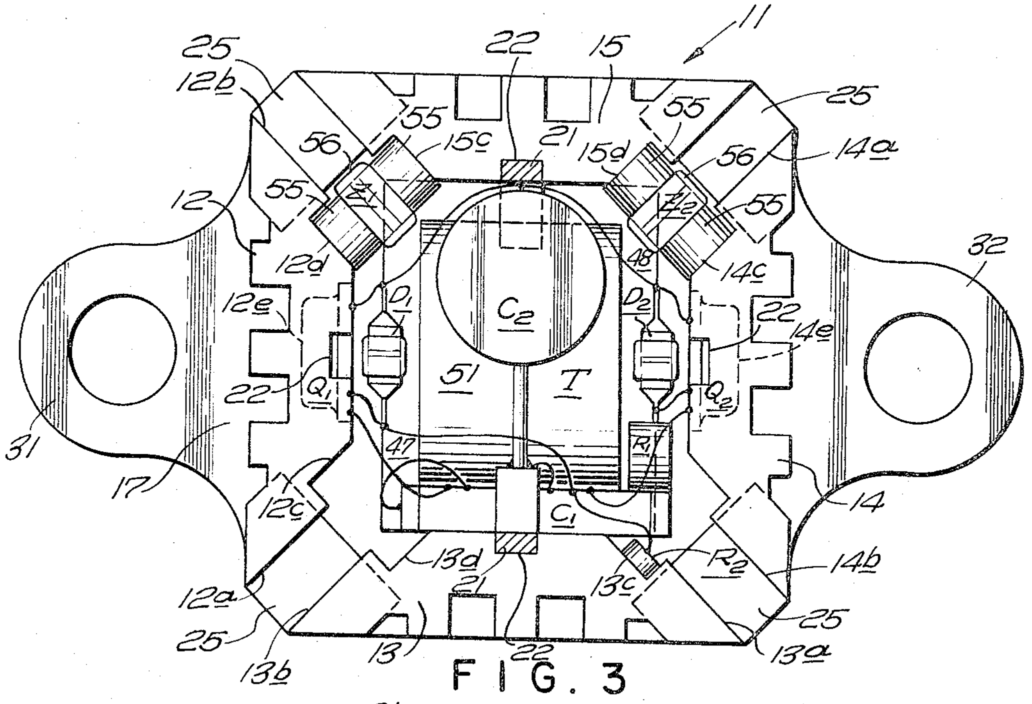
FIG. 3 is a top view of the package of FIG. 1 with the cover removed, thus showing the interior and the components of a specific electronic circuit mounted therein.
Figure 4:
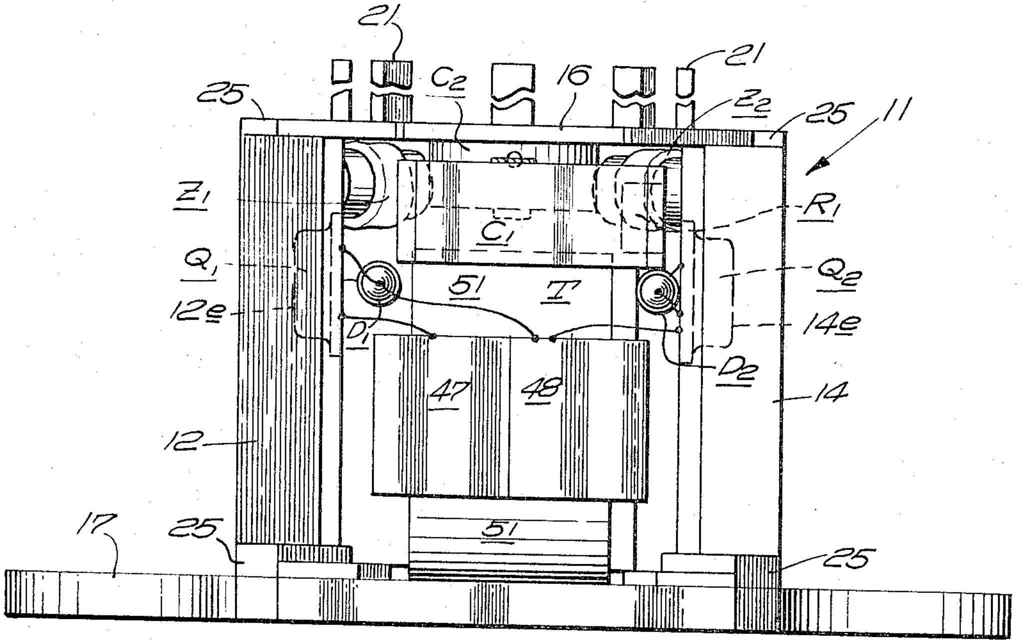
FIG. 4 is a side view of the package of FIG. 1 with one side wall removed, thus showing the internal components as in FIG. 3.

With reference now to the drawing, FIGS. 1, 3, and 4 thereof illustrate in varying detail the novel integrated electronic modular power circuit package 11 constructed and arranged in accordance with the principles of this invention. As is evident from these figures, package 11 is of generally cubical configuration having four substantially identical side walls 12, 13, 14 and 15 capped by appropriate cover and base plates 16 and 17, respectively. A plurality of conductive leads such as 21 extend outwardly from cover plate 16 and facilitate connection to external circuits and power sources as required.

FIG. 2 is an exploded view of a portion of the corner of package 11 between side walls 12 and 13 and this figure when examined in conjunction with FIGS. 1, 3 and 4 will facilitate a complete description of certain structural details. More specifically, each of the side walls 12–15 inclusive is preferably formed of relatively thick electrically and thermally conductive metal such as copper or aluminum, the cross-section of which is shaped for enhanced heat dissipation. As shown in these figures, the metal side walls are generally trapezoidal in shape and are formed with a number of grooves 22 which result in a surface configuration of heat radiating fins, such as 23, and any desired number of grooves 22 may be provided on both the outer and inner faces of the side walls. While the upper and lower end surfaces of the side walls are square, the vertical edge surfaces **12*a* and 12*b* have been bevelled so that when arranged as shown in FIGS. 1, 3, and 4, the confronting edge surfaces of adjacent side walls lie in uniformly spaced parallel relationship. More specifically, the vertical edges of each of the side walls 12–15 has been bevelled to provide the edge surfaces 12*a*–12*b*, 13*a*–13*b*, etc., and a corresponding group of parallel offset edge surfaces 12*c*–12*d*, 13*c*–13*d***, etc. The function of this specific arrangement will be clarified at a later point in this specification.

The four side walls 12–15 are joined together to form a rigid unitized hollow housing of substantially square cross-section by means of eight electrically insulating, thermally conductive corner blocks 25. As is best illustrated in FIG. 2, each of the corner blocks 25 is an integral member having a relatively thick rectangular central area 26 between two outwardly extending reduced thickness flanges 27 and 28. In the assembly of the package 11 corner blocks 25 are inserted in the respective eight corners of the cubical package as shown in FIGS. 1, 3 and 4 in a manner such that the thicker portion 26 acts as a separator for the respective confronting edge surfaces of the side walls to which it is attached.

The corner blocks 25 are, as previously described, electrically insulating and thermally conductive. In this context, thermally conductive is taken to mean the relatively high thermal conductivity normally characteristic of metals such as aluminum, copper, etc. Various ceramic electrically insulating materials, such as beryllia and alumina, offer the desired properties.

For purposes of assembling the structure shown, each of the corner blocks 25 is metalized over surfaces 27 and 28 to provide a surface suited for brazing or soldering. Typically, in assembling the housing shown in FIGS. 1, 3, and 4, the four metal side walls 12–15 may be supported within a fixture (not shown) and the eight corner blocks 25 inserted as described. Brazing or soldering may readily be accomplished, preferably by a pass through a furnace in the presence of a reducing atmosphere in the customary manner.

The central portion of base plate 17 is an essentially square area corresponding with the generally square cross-section of the housing defined by the four side walls 12—15; however, the base plate is also provided with a pair of opposed integral lugs 31 and 32 formed with mounting holes as shown. For optimum heat dissipation, base plate 17 is preferably made of metal; however, if an insulating characteristic is desired, the base 17 may be molded of thermally conductive ceramic.

To attach the base plate 17 to the housing structure, the undersides of each of the four lower corner blocks 25 are provided with an adhering metal film (not shown) similar to the metal films on surfaces 27 and 28, previously described. Through this expedient, the housing may be brazed or soldered to the base by a pass through a furnace at the same time that the four side walls are joined to each other by the corner blocks 25.

Having described the general structural features of the unitized housing, attention will now be turned to the electronic circuit features thereof. While the invention is not limited in any way to a specific electrical circuit, a typical completed device has been presented for illustrative purposes, in this instance an integrated module containing an electrical DC-AC power inverter, the circuit for which is set forth in schematic form in FIG. 5. This schematic circuit will now be briefly discussed as an aid to the understanding of the forthcoming description of the manner in which the circuit components are assembled within the module. As shown, DC power is applied to a pair of input terminals 41 and 42 and an AC power output is derived at selected voltages at terminals 43, 44 and 45 connected to the tapped output winding of transformer T. Six semiconductor elements are used, namely, a pair of diodes $D_1$ and $D_2$, a pair of transistors $Q_1$ and $Q_2$, and a pair of Zener diodes $Z_1$ and $Z_2$. A ceramic capacitor $C_1$ shunts one of the resistors $R_1$ and $R_2$ and a tantalum capacitor $C_2$ shunts the input terminals. Actual operation of the inverter circuit shown will not be described since these circuits are well known in the art; however, the manner in which the components which have just been enumerated are arranged, mounted and wired within the modular package will now be discussed in detail.

The physically largest of the electrical components embodied in the schematic circuit shown in FIG. 5 is transformer T, which occupies the lower central portion of the hollow housing defined between the inner faces of the side walls 12–15 and the upper surface of the base plate 17. The magnetic core of the transformer T is formed of two closely fitting sections 47 and 48 and the transformer coils 51 as shown in FIG. 4 extend down to the base plate 17. In FIG. 3 it may be seen that the core sections 47 and 48 are in intimate surface contact with the inner surfaces of side walls 13 and 15. Under the circumstances, the heat loss of the transformer core is efficiently conducted into side walls 13 and 15 for further dissipation as will be discussed hereafter.

Side walls 12 and 14 have been provided with internal recesses **12*e* and 14*e***, respectively, shaped to accommodate the housings of transistors $Q_1$ and $Q_2$, to be brazed or soldered in contact with those portions of the surfaces of the metal side walls defining the recesses, and as a consequence heat dissipated by these transistors is quickly and effectively diffused into the walls, allowing these devices to be used at increased ratings.

The Zener diodes $Z_1$ and $Z_2$ selected for use in this package are of the leadless type, that is, the active semiconductor element (not shown) is closely confined between a pair of cylindrical conductive metal terminals 55. The diodes are shown encapsulated in part by glass bead 56. This type of structure is particularly adapted to efficient high temperature operation, but it is important to note that the internal construction of the diodes is immaterial and any leadless configuration is acceptable. The diodes may be encapsulated in a ceramic, or may be unencapsulated, as appropriate.

As shown in FIGS. 3 and 4, the Zener diodes $Z_1$ and $Z_2$ have been rgiidly secured between and electrically attached to the confronting offset edge surfaces **12*d* and 15*c* of side walls 12 and 15, and between the offset edge surfaces 14*c* and 15*d* of the side walls 14 and 15** respectively. These diodes, which fit the space between the respective offset edge surfaces, may be soldered in position or, by virtue of their temperature characteristics, brazed into place during a pass through a furnace. It is evident that by securing Zener diodes $Z_1$ and $Z_2$ in the manner depicted in the drawing, the overall strength and rigidity of the package is enhanced.

Resistors $R_1$ and $R_2$ are essentially cylindrical "pellets" with the circular end surfaces tinned for soldering as shown. Resistor $R_2$ is soldered to the offset edge surface **13*c* of side wall 13 and a conventional lead is affixed to the other conductive end thereof. Clearly, heat loss in resistor $R_2$ will be quickly dissipated by virtue of the attachment to side wall 13** allowing higher ratings and utilizing the maximum capability of the basic device. The remaining components, namely diodes $D_1$ and $D_2$, capacitors $C_1$ and $C_2$ and resistor $R_1$ are connected by their leads to the appropriate junctions in the circuit.

At this point it should be observed that the side walls 12–15 provide electrical interconnection for several of the components shown and thus in effect the housing may be considered as part of the electrical wiring for the circuit. It will be recalled that the corner blocks 25 electrically insulate the side walls one from another and that accordingly each side wall serves as an independent wiring conductor. To assist in visualizing the role of the side walls in the circuit, the reference numerals of the four conductive side walls have been indicated on the schematic circuit diagram FIG. 5 in a manner corresponding to the portion of the wiring represented thereby.

As mentioned earlier, and as shown in FIGS. 1 and 4, a plurality of electrical terminal leads 21 are provided for connection to circuits outside the module, to power sources, or to other modular packages. Thus, of the nine leads shown, two are connected internally to DC input terminals 41 and 42 as previously described with reference to FIG. 5, and three are connected to terminals 43, 44 and 45 of the tapped secondary of transformer T. The leads emerge from the package as shown and have a substantially rectangular cross-section such that they fit into the coextensive grooves 22 in the center of the inside faces of side walls 12–15 as shown in FIGS. 2 and 3. The leads are made of electrically conductive ribbon such as nickel which has relatively low thermal conductivity to facilitate soldering or brazing to external circuits, and for convenience, the nickel terminals may be tinned or plated with silver, as desired.

To complete the assembly as has just been described, insulating cover plate 16, which is provided with openings for the passage of leads 21, is fixed in place by a suitable adhesive. The openings in cover 16 and the positions of leads 21 coincide and are shown in an asymmetrical configuration which facilitates keying where harness or circuit board plug-in is desirable. Four of the nine holes in cover 16 coincide with leads which may be brazed, soldered or welded into internal grooves 22, these leads providing external electrical connections to side walls 12–15 and elements connected to them. The other five holes in cover 16 may be used for making connections to other internal circuit points such as secondary terminals of transformer T. It is thus apparent that cover 16 provides both electrical separation and physical stability for the positions of leads 21. Cover 16 also has a central opening **16*a*** to permit the remaining internal volume of the housing to be filled with an encapsulant, such as epoxy resin, if desired. The use of such an encapsulant improves the rigidity of the module and increases its shock resistance. The resin is also effective in improving the uniform distribution of heat through the package for conduction to the side walls, cover and base.

Referring again to FIG. 1, it will be noted that the lower ends of the side walls are raised from base 17 by corner blocks 25. Also, since the edges of cover 16 do not extend completely over the upper ends of the side walls, grooves 22 and fins 23 remain free of obstructions to provide maximum efficiency in dissipating heat to the surrounding atmosphere by natural convection.

Figure 6:
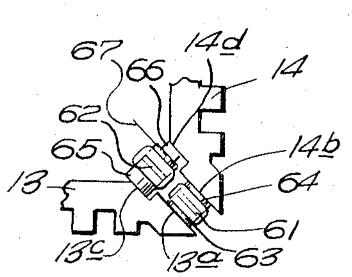
FIG. 6 is a top view of one corner of the package of FIG. 3 showing certain electronic components mounted for connection between adjacent side wall elements.

In connection with FIGS. 3 and 4, it was shown that the Zener diodes $Z_1$ and $Z_2$ were mounted between the confronting edge surfaces of adjacent side walls. Thus, Zener diode $Z_1$ was shown to be electrically connected between side walls 12 and 15; the function of the side walls as electrical wiring being illustrated in FIG. 5. With reference now to FIG. 6, there is shown a fragmentary view of the corner between side walls 13 and 14 with two semiconductor elements mounted therebetween. Semiconductor element 61 is a cylindrically terminated diode having the external physical characteristics of the previously mentioned Zener diodes, except that it is of lesser axial length. The outer electrically conductive terminals 63 and 64 of diode 61 are shown as brazed or soldered to edge surfaces **13*a* and 14*b***, respectively.

Semiconductor element 62 is a three-terminal device, two terminals of which are defined by electrically conductive cylindrical metal terminals 65 and 66, while the third terminal comprises an outwardly extending flexible lead 67. Terminals 65 and 66 are brazed or soldered to the offset edge faces surfaces **13*c* and 14*d***, respectively, for electrical connection and heat dissipation. It is at once evident that the offset arrangement shown for the confronting edge surfaces of the side walls may be utilized to accept electrical components of various dimensions.

Figure 7A:
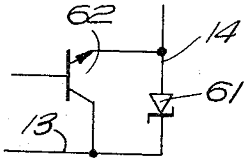
FIGS. 7A and 7B are schematic circuit diagrams characteristic of the components and electrical connections shown in FIG. 6.

FIG. 7A is a schematic circuit diagram showing the effective electrical connection between semiconductor elements 61 and 62, the former being shown as a Zener diode and the latter as a transistor. While FIG. 6 was not presented for the specific purpose of depicting any particular circuit subcombination shown in FIG. 5, it should be noted that FIG. 7A does correspond with either combination $Q_1$–$Z_1$, or $Q_2$–$Z_2$. Hence, the circuit of FIG. 5 may be assembled with a transistor-Zener arrangement as in FIG. 6, if desired.

Figure 7B:
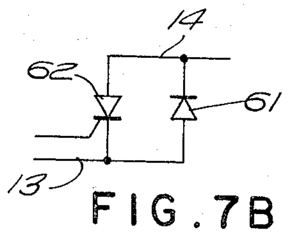

FIG. 7B shows effectively the same circuit but with element 61 shown as a customary diode and semiconductor device 62 as an SCR. Clearly, while shown as semiconductor devices, other electronic components such as resistors or capacitors may be connected in circuit in the space between adjacent surfaces of the side walls.

At this juncture it would be appropriate to summarize the advantages and utility of the present invention and in this regard it will be helpful to consider typical physical and electrical operating characteristics for the modular integrated package described above in connection with FIGS. 1, 3, 4 and 5. A DC-AC inverter circuit as shown may be assembled in a substantially cubical housing with a volume of only one-half cubic inch. With a typical input of 50 volts DC the device provides an AC output of up to 50 watts at 3.0 volts to 400 volts and up to 50 kHz. with a total weight including cover and base plates of 0.75 ounce. Even with the exceedingly high power rating for a device of this size and weight, the thermal design prevents the possibility of encountering destructive temperatures. This power-size-weight ratio is possible since the heat loss of the system is effectively transferred to and dissipated through the side walls and base, aided by conduction through the corner blocks.

An important feature of this invention is the design flexibility afforded circuit and packaging engineers. The side walls of the housing may be made of metal as previously described or they may be made of thermally conductive ceramic, such as beryllia or alumina, coated with an electrically conductive metal film. The side walls made in this manner will appear exactly as those shown in the present drawings. As desired, some of the side walls may be of solid metal while others may be metal coated ceramic.

In connection with the discussion of FIGS. 6, 7A and 7B, it was shown that certain relatively small three-leaded semiconductor elements may be secured in the corner spaces thus making it unnecessary at times to provide recesses in the side walls to receive transistor cases, as shown in FIGS. 3 and 4. Conversely, if it is desired to use large semiconductor components, a hole may be bored completely through a side wall and the device may be mounted to extend outside the package wall in whole or in part.

Although the package described and illustrated in the drawing is four-sided and essentially cubical, the invention broadly contemplates modular packages which are prismatic in form and of any length required to house the electronic components. For example, with an appropriate choice of angles for the bevelled edge surfaces of the side walls and for the corner blocks, a prismatic housing with pentagonal cross-section may be achieved. An advantage of such structure is the availability of five instead of four conductive side walls for wiring purposes. Higher order polygons may similarly be made.

In some applications it may be desirable to omit the base and cover plates and to omit the epoxy resin that has been discussed. Under these conditions the structure is ideally suited for cooling by convection, both across the outer finned surfaces and through the inner volume containing the electronic components.

Earlier in the specification it was noted that Zener diodes $Z_1$ and $Z_2$, FIGS. 3 and 4, effectively increased the rigidity of the structure due to the manner in which these components were mounted in the spaces between edge faces of the side walls. Through the use of this mounting technique, illustrated further in FIG. 6, it is possible to dispense with the corner blocks 25 and rely solely upon the electronic components in the spaces between the side walls to furnish a rigid, unitized structure. This is particularly true when an epoxy fill is employed. The ultimate decision depends upon the stresses anticipated for the integrated power module.

In view of the foregoing, it is apparent that many modifications of the present invention may now be made by those skilled in the art without departing from the spirit thereof. Accordingly, it is intended that this invention be limited only by the scope of the appended claims.

What is claimed is:

1. An integrated electronic modular power circuit package comprising:

a plurality of individual electrically conductive, heat dissipative side wall elements;

thermally conductive, electrically insulating means for mechanically and thermally joining adjacent ones of said side wall elements to form a rigid unitized hollow housing of substantially polyginal cross-section having insulatively separated and electrically conducting side walls; and electronic components constituting a modular circuit disposed within said housing, at least some of said components being attached in thermal contact with said side wall elements, the thermal contact portion of some of said components also making a direct electrical contact with selected ones of said side wall elements;

whereby said side wall elements provide physical support, electrical interconnection and thermal disspation for said electronic components, together with structural rigidity for said modular package.

2. An integrated electronic modular power circuit package as in claim 1, wherein:

said thermally conductive, electrically insulating means for joining said side wall elements comprise spacing blocks formed of a material selected from the group consisting of beryllia and alumina.

3. An integrated electronic modular power circuit package as in claim 1, and further comprising:

an electrically and thermally conductive base attached to and insulatively separated from said housing by said thermally conductive, electrically insulating joining means;

whereby said base provides further structural rigidity for said modular package and additional thermal dissipation for said electronic components.

4. An integrated electronic modular power circuit package as in claim 3, and further comprising:

an electrically insulating cover for an end of said housing having a plurality of spaced openings; and a corresponding plurality of electrical terminals connected to said modular circuit within said housing and extending outwardly therefrom through said openings to facilitate connection of external electrical apparatus thereto.

5. An integrated electronic modular power circuit package as in claim 3, wherein:

said thermally conductive, electrically insulating means for joining said side wall elements and for attaching said housing to said base comprises a corner block at each corner of said housing, each of said corner blocks being formed with surfaces for rigid attachment to said side walls and with an enlarged region for mechanically spacing said side walls.

6. An integrated electronic modular power circuit package as in claim 1, wherein:

each of said side wall elements is of generally trapezoidal cross-section, at least one of the two parallel faces thereof being formed with substantially coextensive fins for enhanced heat dissipation, the two edge surfaces thereof being bevelled with respect to said parallel faces at angles whereby the edge-to-edge juxtaposition of said plurality of said side wall elements, with immediately adjacent bevelled edge surfaces in spaced parallel relationship, defines said hollow housing of said polygonal cross-section.

7. An integrated electronic modular power circuit package as in claim 6, and further comprising:

a base attached to and spaced from an end of said housing;

a cover for the open opposite end of said housing, said cover being dimensioned to expose the respective ends of said fins;

whereby convection over said fins including the ends thereof is substantially enhanced.

8. An integrated electronic modular power circuit package as in claim 6, wherein:

at least one of said side wall elements is provided with a recess internally of said housing, one of said electronic components of said modular circuit being disposed within said recess and in intimate surface contact with the respective side wall element for further enhanced heat dissipation.

9. An integrated electronic modular power circuit package as in claim 6, wherein:

said side wall elements are formed of ceramic with a uniform and continuous surface coating of electrically conductive material.

10. An integrated electronic modular power circuit package as in claim 6, wherein:

at least one of said electronic components of said modular circuit is mechanically supported and electrically connected between juxtaposed bevelled edge surfaces of one pair of adjacent side wall elements.

11. An integrated electronic modular power circuit package as in claim 6, wherein:

each one of at least a pair of said juxtaposed bevelled edge surfaces is formed to provide two offset parallel coextensive bevelled surfaces;

whereby said edge-to-edge juxtaposition thereof provides first and second component supporting regions of first and second sizes at the respective corner of said polygonal housing.

12. An integrated electronic modular power circuit package as in claim 11, wherein:

selected ones of said electronic components of said modular circuit are mechanically supported and electrically connected between said pair of juxtaposed edges within said first and second component supporting regions.

13. An integrated electronic modular power circuit package comprising:

a plurality of individual electrically conductive side wall elements having surfaces shaped for enhanced heat dissipation;

means for mechanically and thermally joining adjacent ones of said side wall elements in spaced relationship to form a rigid unitized hollow housing of substantially polygonal cross-section having electrically conducting side walls with spaces therebetween; and electronic components constituting a modular circuit disposed within said housing, at least one of said components being disposed in the space between successive adjacent ones of said side wall elements and attached in thermal contact with and connected electrically to said adjacent side wall elements;

whereby said side wall elements provide physical support, electrical interconnection and thermal dissipation for said electronic components, together with structural rigidity and thermal diffusion for said modular package.

14. An integrated electronic modular power circuit package as in claim 13, wherein:

said joining means are selected ones of said electronic components.

References Cited

UNITED STATES PATENTS

| | | | |
|---|---|---|---|
| 2,999,971 | 9/1961 | Schnecke | 165 |
| 3,200,296 | 8/1965 | Bruestle | 317—100 |
| 3,277,346 | 10/1966 | McAdam et al. | 317—100 |

ROBERT K. SCHAEFER, *Primary Examiner.*

ROBT. S. MACON, *Examiner.*

MORRIS GINSBURG, *Assistant Examiner.*